(12) United States Patent
Kwon et al.

(10) Patent No.: US 12,537,242 B2
(45) Date of Patent: Jan. 27, 2026

(54) BATTERY MODULE WITH IMPROVED UNIFORMITY IN TEMPERATURE OF BATTERY CELLS

(71) Applicant: LG ENERGY SOLUTION, LTD., Seoul (KR)

(72) Inventors: Bong Keun Kwon, Daejeon (KR); Byung O Park, Daejeon (KR); Jae Sung Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 631 days.

(21) Appl. No.: 17/916,352

(22) PCT Filed: Jan. 27, 2022

(86) PCT No.: PCT/KR2022/001534
§ 371 (c)(1),
(2) Date: Sep. 30, 2022

(87) PCT Pub. No.: WO2022/169210
PCT Pub. Date: Aug. 11, 2022

(65) Prior Publication Data
US 2023/0135644 A1 May 4, 2023

(30) Foreign Application Priority Data
Feb. 4, 2021 (KR) .................. 10-2021-0016146

(51) Int. Cl.
*H01M 10/647* (2014.01)
*H01M 10/48* (2006.01)
(Continued)

(52) U.S. Cl.
CPC ....... *H01M 10/647* (2015.04); *H01M 10/482* (2013.01); *H01M 10/613* (2015.04); *H01M 10/6555* (2015.04); *H01M 50/211* (2021.01)

(58) Field of Classification Search
None
See application file for complete search history.

(56) References Cited

U.S. PATENT DOCUMENTS 11,749,852 B2 * 9/2023 Park .................... H01M 10/613
429/163
2011/0189523 A1 8/2011 Eom
(Continued)

FOREIGN PATENT DOCUMENTS

CN 102593549 A 7/2012
CN 108475832 A 8/2018
(Continued)

OTHER PUBLICATIONS

Extended European Search Report for European Application No. 22749960.5, dated Jul. 5, 2024.
(Continued)

*Primary Examiner* — Scott J. Chmielecki
(74) *Attorney, Agent, or Firm* — Birch, Stewart, Kolasch & Birch, LLP

(57) ABSTRACT

A battery module includes a module case having a battery cell stack constituted by a plurality of stacked battery cells received therein, a heat dissipation resin added between the battery cell stack and a first surface of the module case, a cooling member coupled outside the first surface of the module case, the cooling member being configured to cool the battery cell stack, and a heat transfer material added to a middle part of an outer surface of the cooling member that faces the first surface of the module case. The heat transfer material is disposed at a part of the battery cell stack that has a relatively high temperature, whereby temperature deviation between the battery cells is reduced.

11 Claims, 4 Drawing Sheets

(51) Int. Cl.
  *H01M 10/613* (2014.01)
  *H01M 10/6555* (2014.01)
  *H01M 50/211* (2021.01)

(56) References Cited

U.S. PATENT DOCUMENTS

| | | |
|---|---|---|
| 2012/0177960 A1 | 7/2012 | Tasal et al. |
| 2014/0363709 A1 | 12/2014 | Tasal et al. |
| 2016/0141735 A1* | 5/2016 | Motohashi ........ H01M 10/6554 429/120 |
| 2017/0040652 A1 | 2/2017 | Tasal et al. |
| 2017/0301967 A1* | 10/2017 | Kim ..................... H01M 10/63 |
| 2018/0301773 A1* | 10/2018 | Sugiyama ............. H01M 50/24 |
| 2018/0366794 A1 | 12/2018 | Kim et al. |
| 2019/0058228 A1 | 2/2019 | Tasal et al. |
| 2019/0074557 A1* | 3/2019 | Shin ................. H01M 10/6553 |
| 2019/0148799 A1 | 5/2019 | Lim et al. |
| 2020/0220124 A1* | 7/2020 | Park ..................... H01M 10/482 |
| 2020/0259226 A1 | 8/2020 | Keller |
| 2020/0313253 A1 | 10/2020 | Ahn |
| 2020/0365855 A1* | 11/2020 | Murayama .......... H01M 50/227 |
| 2021/0013465 A1* | 1/2021 | Sakurai ............... H01M 10/625 |
| 2021/0028518 A1 | 1/2021 | Jeon et al. |
| 2021/0296721 A1* | 9/2021 | Omura ................ H01M 10/647 |
| 2021/0316619 A1* | 10/2021 | Geskes ............. H01M 10/6554 |
| 2022/0093991 A1* | 3/2022 | Cournoyer .......... H01M 50/213 |
| 2022/0131207 A1 | 4/2022 | Ahn |
| 2022/0238934 A1* | 7/2022 | Roh .................... H01M 50/204 |
| 2022/0320614 A1* | 10/2022 | Kondo ................. H01M 10/48 |
| 2022/0407139 A1* | 12/2022 | Kim .................... H01M 50/231 |

FOREIGN PATENT DOCUMENTS

| | | |
|---|---|---|
| CN | 108735936 A | 11/2018 |
| CN | 211150722 U | 7/2020 |
| CN | 111554996 A | 8/2020 |
| CN | 111742442 A | 10/2020 |
| CN | 211980672 U | 11/2020 |
| JP | 10-92394 A | 4/1998 |
| JP | 5456371 B2 | 3/2014 |
| JP | 6717212 B2 | 7/2020 |
| JP | 2021-500708 A | 1/2021 |
| KR | 10-1093959 B1 | 12/2011 |
| KR | 10-1560217 B1 | 10/2015 |
| KR | 10-1827402 B1 | 2/2018 |
| KR | 10-2019-0053574 A | 5/2019 |
| KR | 10-2020-0004202 A | 1/2020 |
| KR | 10-2128588 B1 | 7/2020 |
| KR | 10-2021-0011640 A | 2/2021 |

OTHER PUBLICATIONS

International Search Report (PCT/ISA/210) issued in PCT/KR2022/001534, dated May 9, 2022.

* cited by examiner

[FIG. 1]
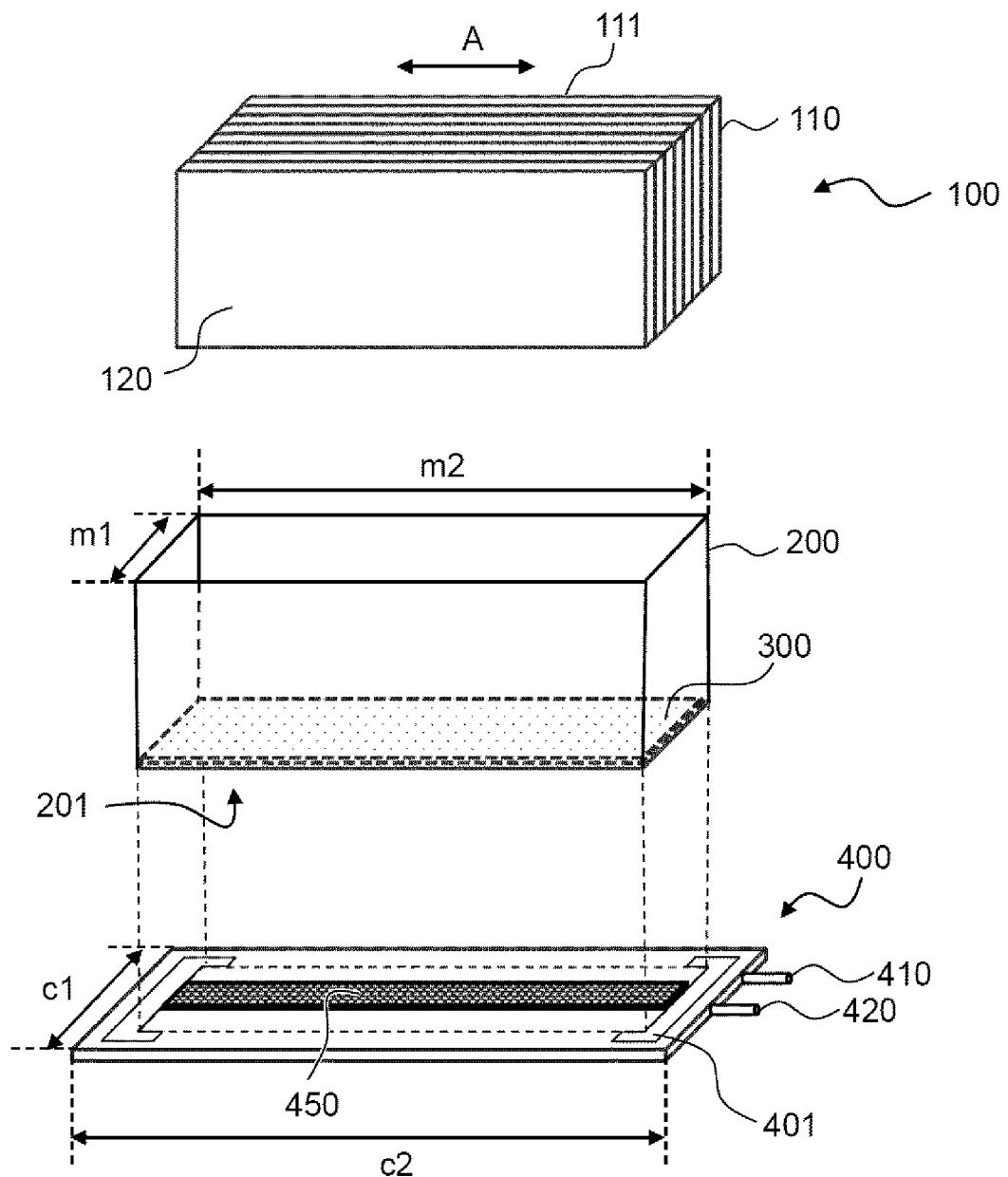

【FIG. 2】
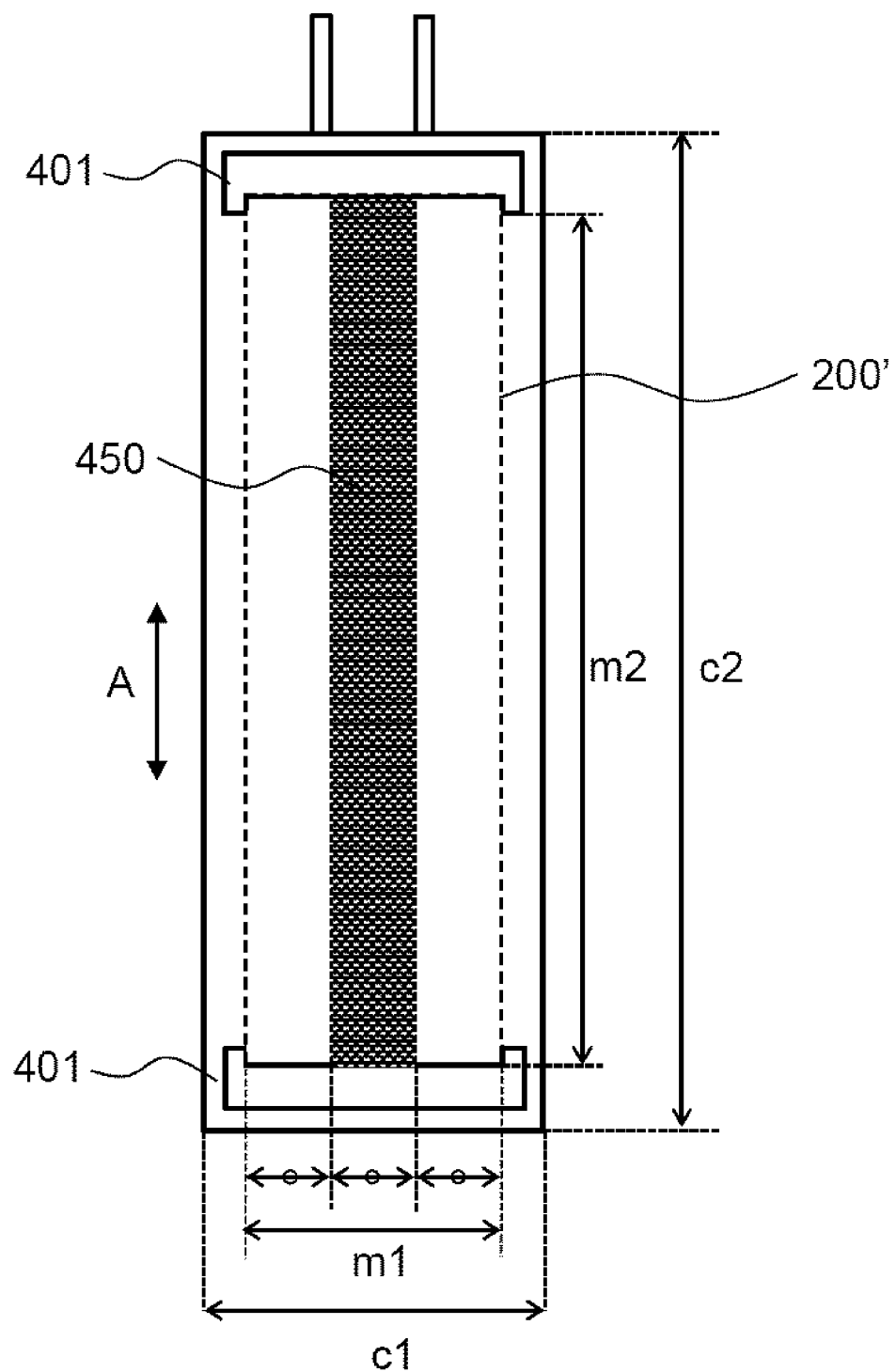

[FIG. 3]
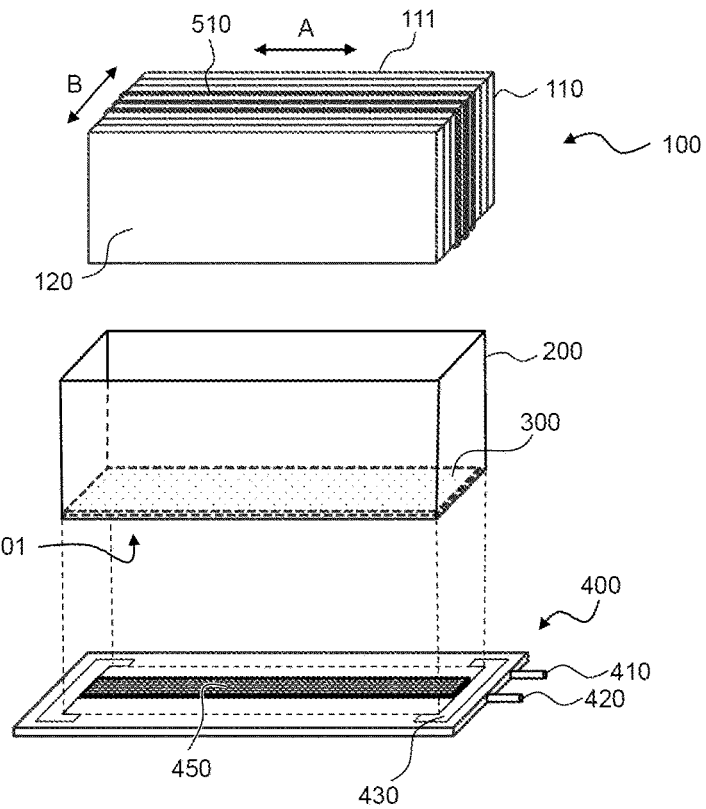
[FIG. 4]
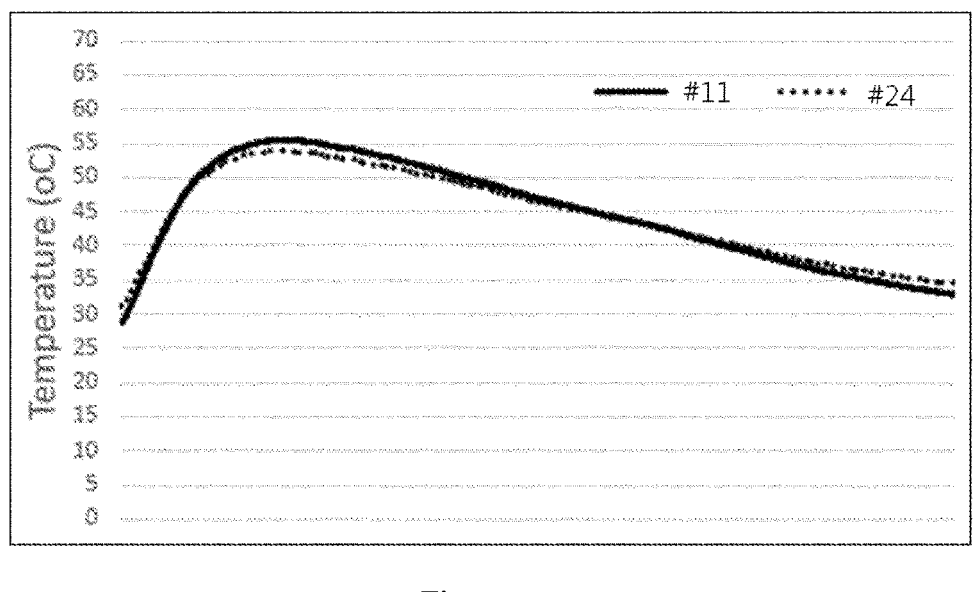
Time

【FIG. 5】
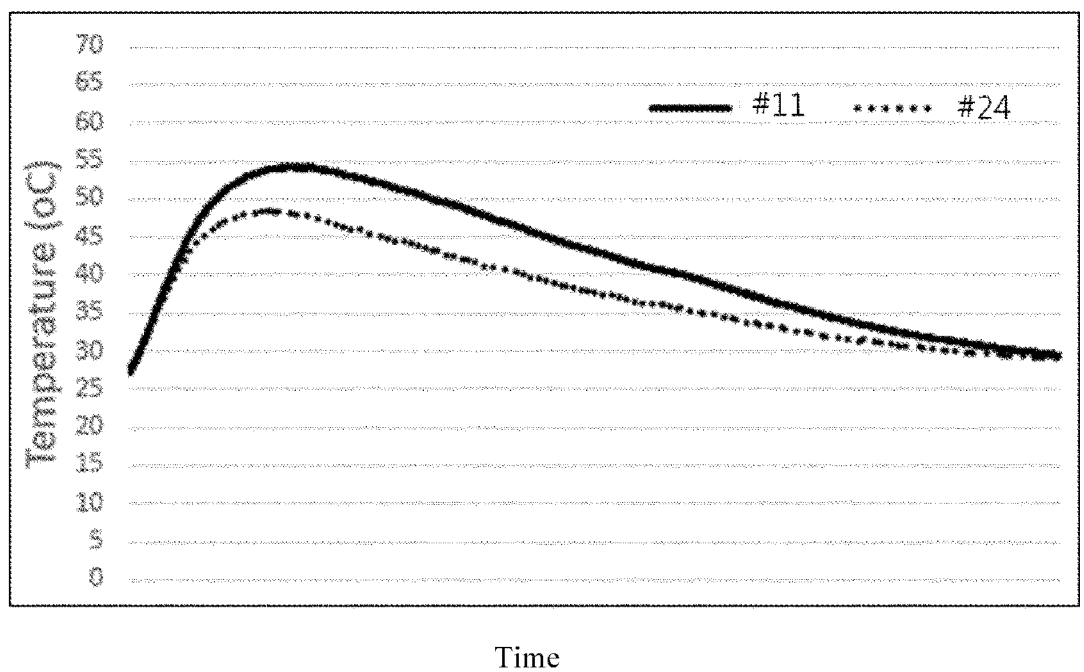

BATTERY MODULE WITH IMPROVED UNIFORMITY IN TEMPERATURE OF BATTERY CELLS

TECHNICAL FIELD

This application claims the benefit of priority to Korean Patent Application No. 2021-0016146 filed on Feb. 4, 2021, the disclosure of which is incorporated herein by reference in its entirety.

The present invention relates to a battery module with improved uniformity in temperature of battery cells. More particularly, the present invention relates to a battery module with improved uniformity in temperature of battery cells capable of preventing temperature deviation between a plurality of battery cells constituting the battery module due to a difference in heat loss depending on the position of the battery cells.

BACKGROUND ART

Improvement in stability and increase in capacity of a lithium secondary battery, which is capable of being charged and discharged, have been rapidly achieved, and kinds of devices that use the lithium secondary battery as an energy source have been increased.

For example, the lithium secondary battery has been widely used as an energy source for wireless mobile devices, which are small multifunctional products, or wearable devices, which are worn on the body, and has also been used as an energy source for electric vehicles and hybrid electric vehicles presented as alternatives to existing gasoline and diesel vehicles, which cause air pollution, or as an energy storage system (ESS).

Based on the shape of a battery case, the lithium secondary battery is classified into a cylindrical secondary battery having an electrode assembly mounted in a cylindrical metal can, a prismatic secondary battery having an electrode assembly mounted in a prismatic metal can, or a pouch-shaped secondary battery having an electrode assembly mounted in a pouch-shaped case made of an aluminum laminate sheet. Thereamong, the pouch-shaped secondary battery has advantages of easy deformation and high energy density per unit volume.

As an energy source for medium and large devices that require high output and high energy density, a plurality of pouch-shaped battery cells may be received in a module case in the state in which the battery cells are arranged in tight contact with each other while being electrically connected to each other in order to manufacture a battery module.

At this time, a heat dissipation resin may be added between the plurality of pouch-shaped battery cells and the module case in order to discharge heat generated in the battery cells out of the module case.

In general, when the plurality of pouch-shaped battery cells is received in the module case in a state of being stacked, individual battery cells have similar heat dissipation characteristics, whereas a difference in heat loss occurs depending on the position of the battery cells, whereby temperature deviation generally occurs between the battery cells.

Specifically, among the battery cells, the battery cell located at an edge has large heat loss, whereas the battery cell located at a middle part has small heat loss. As a result, the battery cell located at the edge has a relatively low temperature, and the battery cell located at the middle part has a relatively high temperature.

Temperature deviation between the battery cells may cause not only a difference in degradation speed between the battery cells but also degradation in performance of the battery module.

In connection therewith, Patent Document 1 discloses a mono block battery configured such that a plurality of cell chambers is disposed adjacent to each other, wherein a heat dissipation acceleration member is added to a cell chamber located at a middle in order to reduce a difference in temperature between the cell chamber located at the middle and an edge-side cell chamber that abuts the outside and has a large area, since the edge-side cell chamber has large heat loss.

Patent Document 1 discloses technology for disposing the heat dissipation acceleration member, which has excellent thermal conductivity, at an outer wall of the battery to reduce the temperature of the battery; however, it is difficult to rapidly and continuously reduce the temperature of the battery since an external member, such as a cooling device, is not used.

Patent Document 2 discloses a battery module configured such that a plurality of through-holes is formed in a support member configured to receive a plurality of battery cells, the plurality of through-holes is filled with a heat transfer material, and a heat sink is disposed in contact with the support member.

The plurality of battery cells of Patent Document 2 may discharge heat to the heat sink through the heat transfer material included in the support member; however, technology for preventing temperature deviation between the plurality of battery cells is not disclosed.

Therefore, there is a need for technology capable of preventing temperature deviation between a plurality of battery cells constituting a battery module and effectively discharging heat.

Prior Art Documents (Patent Document 1) Japanese Patent Application Publication No. 1998-092394 (1998 Apr. 10)
(Patent Document 2) Korean Patent Application Publication No. 2020-0004202 (2020 Jan. 13)

DISCLOSURE

Technical Problem

The present invention has been made in view of the above problems, and it is an object of the present invention to provide a battery module including a structure in which temperature deviation between battery cells is reduced, whereby performance of the battery module is improved.

Technical Solution

A battery module according to the present invention to accomplish the above object includes a module case having a battery cell stack constituted by a plurality of stacked battery cells received therein, a heat dissipation resin added between the battery cell stack and a first surface of the module case, a cooling member coupled outside the first surface of the module case, the cooling member being configured to cool the battery cell stack, and a heat transfer material added to a middle part of an outer surface of the cooling member that faces the first surface of the module case.

Each of the plurality of battery cells may be a pouch-shaped battery cell, the pouch-shaped battery cells of the battery cell stack may be stacked such that bottom surfaces of electrode assembly receiving portions of the pouch-shaped battery cells are perpendicular to the first surface of the module case, and outer surfaces of the pouch-shaped battery cells in an overall length direction may be disposed parallel to the first surface of the module case.

The heat transfer material may be added in an overall length direction of the module case so as to have a length corresponding to the length of the module case in the overall length direction.

The heat transfer material may be added to the middle part of the outer surface of the cooling member when an area of the cooling member to the module case is divided into three equal parts along an overall width thereof.

The heat transfer material may have a thickness of 0.5 mm to 3 mm.

The battery cell stack may include a cooling plate disposed between the plurality of stacked battery cells.

The cooling plate may be disposed between the battery cells located at a middle part of the plurality of stacked battery cell stack in a stacking direction.

The cooling plate may be disposed at an inner surface of the part of the first surface of the module case that faces the heat transfer material.

The cooling member may be a heat sink having a refrigerant inlet and a refrigerant outlet.

Temperature deviation between the plurality of battery cells may be less than 3° C.

The overall width and the overall length of the cooling member may be greater than the overall width and the overall length of the module case, respectively.

In addition, the present invention may provide various combinations of the above solving means.

Advantageous Effects

As is apparent from the above description, it is possible to minimize temperature deviation between battery cells of a battery cell stack received in a module case according to the present invention.

Consequently, it is possible to prevent shortening in lifespan of the battery module or degradation in performance of the battery module due to temperature deviation between the battery cells.

DESCRIPTION OF DRAWINGS

FIG. 1 is an exploded perspective view of a battery module according to a first embodiment.

FIG. 2 is a plan view of a cooling member to which a heat transfer material of FIG. 1 is added.

FIG. 3 is an exploded perspective view of a battery module according to a second embodiment.

FIG. 4 is a graph showing changes in temperature of battery cells in a battery module according to Example.

FIG. 5 is a graph showing changes in temperature of battery cells in a battery module according to Comparative Example.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, embodiments of the present invention will be described in detail with reference to the accompanying drawings.

FIG. 1 is an exploded perspective view of a battery module according to a first embodiment.

Referring to FIG. 1, the battery module according to the first embodiment includes a module case 200 having a battery cell stack 100 constituted by a plurality of stacked battery cells 110 received therein, a heat dissipation resin 300 added between the battery cell stack 100 and a first surface 201 of the module case 200, a cooling member 400 coupled outside the first surface 201 of the module case 200 in order to cool the battery cell stack 100, and a heat transfer material 450 added to a middle part of an outer surface of the cooling member 400 that faces the first surface 201 of the module case 200.

The battery cell stack 100 is configured such that the plurality of pouch-shaped battery cells is disposed in a direction in which bottom surfaces 120 of electrode assembly receiving portions are brought into tight contact with each other. Each of the battery cells 110 may be configured such that electrode leads (not shown) protrude outwards from a battery case to perform electrical connection.

In the battery cell stack 100, the pouch-shaped battery cells are stacked such that the bottom surfaces 120 of the electrode assembly receiving portions of the pouch-shaped battery cells are perpendicular to the first surface 201 of the module case 200, and outer surfaces 111 of the pouch-shaped battery cells in an overall length direction A, i.e. side surfaces of the electrode assembly receiving portions, are disposed parallel to the first surface 201 of the module case 200.

The heat dissipation resin 300 is added inside the first surface 201 of the module case 200, and a space formed between the battery cell stack 100 and the module case 200 may be filled with the heat dissipation resin 300. Consequently, thermal energy of the battery cell stack 100 may be discharged outside the first surface 201 of the module case 200 through the heat dissipation resin 300.

When the thermal energy generated in the battery cell stack is discharged through the heat dissipation resin 300, the cooling member 400 rapidly cools the discharged thermal energy. In order to maintain low temperature of a refrigerant configured to perform heat exchange, therefore, it is preferable for the refrigerant to flow so as to be introduced into and discharged from the cooling member.

For example, therefore, the cooling member 400 may be a heat sink having a refrigerant inlet 410 and a refrigerant outlet 420.

Meanwhile, in order to rapidly cool the thermal energy discharged through the heat transfer material 450 such that heat is smoothly discharged from the battery cells located at a middle part of the battery cell stack, it is preferable for the planar size of the cooling member 400 to be greater than the area of the first surface 201 of the module case that faces the heat transfer material 450.

Consequently, the overall width c1 and the overall length c2 of the cooling member 400 may be greater than the overall width m1 and the overall length m2 of the module case 200, respectively.

FIG. 2 is a plan view of the cooling member to which the heat transfer material of FIG. 1 is added.

Referring to FIG. 2, a module case disposition portion 200', which is a portion at which the module case is disposed, may be provided at an upper surface of the cooling member 400, and a guide portion 401 configured to fix the position of the module case may be added to each of an upper part and a lower part of the module case disposition portion 200'.

The heat transfer material 450 is added to the outer surface of the cooling member 400 in a rectangular shape in plan view, and the heat transfer material is added in the overall length direction A of the module case 200 so as to have a length corresponding to the length of the module case 200 in the overall length direction A.

The heat transfer material 450 is formed so as to have a width corresponding to one third of the overall width m1 of the module case disposition portion 200' having the same area as the module case 200 in the outer surface of the cooling member 400 that faces the first surface 201 of the module case 200. The heat transfer material 450 is added to a middle one of the three equally divided widths.

The heat transfer material may be formed so as to have a thickness of 0.5 mm to 3 mm, specifically 1 mm to 3 mm.

At opposite sides of the heat transfer material added so as to have a predetermined thickness as described above, a gap may be formed between the module case and the cooling member. In order to fill the gap, a support portion made of a material that has low thermal conductivity may be disposed. The thickness of the support portion may be equal to the thickness of the heat transfer material.

Since the support portion is made of a material that has low thermal conductivity, the battery cells located at the middle part of the battery cell stack may perform better heat exchange through the heat transfer material than the battery cells located at an edge of the battery cell stack even though the support portion is interposed between the module case and the cooling member.

The material for the heat transfer material is not particularly restricted as long as the material has excellent thermal conductivity. For example, the heat transfer material may be made of at least one selected from the group consisting of a urethane-based material, an epoxy-based material, and a silicone-based material.

FIG. 3 is an exploded perspective view of a battery module according to a second embodiment.

Referring to FIG. 3, the battery module according to the second embodiment includes a module case 200 having a battery cell stack 100 constituted by a plurality of stacked battery cells 110 received therein, a heat dissipation resin 300 added between the battery cell stack 100 and a first surface 201 of the module case 200, a cooling member 400 coupled outside the first surface 201 of the module case 200 in order to cool the battery cell stack 100, and a heat transfer material 450 added to a middle part of an outer surface of the cooling member 400 that faces the first surface 201 of the module case 200.

The battery cell stack 100 is configured such that the plurality of pouch-shaped battery cells is disposed in a direction in which bottom surfaces 120 of electrode assembly receiving portions are brought into tight contact with each other. Each of the battery cells 110 may be configured such that electrode leads (not shown) protrude outwards from a battery case to perform electrical connection.

In the battery cell stack 100, the bottom surfaces 120 of the electrode assembly receiving portions of the pouch-shaped battery cells are stacked so as to be perpendicular to the first surface 201 of the module case 200, and outer surfaces 111 of the pouch-shaped battery cells in the overall length direction A, i.e. side surfaces of the electrode assembly receiving portions, are disposed parallel to the first surface 201 of the module case 200.

The battery cell stack 100 includes a cooling plate 510 disposed between the battery cells 110. The cooling plate 510 is disposed between the battery cells located at a middle part of the battery cell stack 100 in a stacking direction B. FIG. 3 shows the state in which three cooling plates 510 are disposed between the battery cells 110.

Heat may be more effectively discharged from the battery cells located at the middle part of the battery cell stack 100 due to disposition of the cooling plate 510.

In addition, since the cooling plate 510 is disposed between the battery cells that face the heat transfer material 450 in the first surface 201 of the module case 200, the cooling plate 510 and the heat transfer material 450 may be disposed adjacent to each other. Consequently, a heat dissipation effect of the battery cells 110 located at the middle part of the battery cell stack 100 may be increased.

Meanwhile, for the same components included in the battery module according to the first embodiment and the battery module according to the second embodiment, a description of the battery module according to the first embodiment may be equally applied to the battery module according to the second embodiment.

Hereinafter, the present invention will be described with reference to an example. This example is provided only for easier understanding of the present invention and should not be construed as limiting the scope of the present invention.

Example

A battery module including 24 pouch-shaped battery cells was prepared, and the 24 pouch-shaped battery cells were numbered from a first battery cell to a twenty-fourth battery cell. Thermocouples were inserted into the battery module so as to be attached to surfaces of an eleventh battery cell (#11) and the twenty-fourth battery cell (#24).

As shown in FIG. 1, the area of an upper surface of a cooling member corresponding to a portion in which the battery module was disposed was divided into three equal parts, and a heat transfer material was applied to only a middle one of the three equal parts so as to have a thickness of 1 mm.

The thermocouples were connected to a charger and discharger (manufactured by PNESOLUTION CO., LTD. (a module charger and discharger having specifications of 60V/600 A)), and temperatures of the eleventh battery cell (#11) and the twenty-fourth battery cell (#24) were measured while the battery module was repeatedly charged and discharged.

FIG. 4 is a graph showing changes in temperature of the battery cells in the battery module according to Example.

FIG. 4 shows a part of a third charging cycle.

Referring to FIG. 4, the measured temperature of the eleventh battery cell, disposed at a middle part, was higher than the measured temperature of the twenty-fourth battery cell, disposed at an edge, except for initial temperature and late temperature.

The maximum temperature deviation between the eleventh battery cell, disposed at the middle part, and the twenty-fourth battery cell, disposed at the edge, is 2.4° C., and the average temperature deviation therebetween is about 1° C.

Comparative Example

A battery module was prepared in the same manner as in Example except that a heat transfer material was applied to the entirety of the area of an upper surface of a cooling member corresponding to a portion in which the battery module was disposed.

Temperatures of an eleventh battery cell (#11) disposed at a middle part and a twenty-fourth battery cell (#24) disposed at an edge, among a plurality of pouch-shaped battery cells, were measured while the battery module was repeatedly charged and discharged, in the same manner as in Example.

FIG. 5 is a graph showing changes in temperature of the battery cells in the battery module according to Comparative Example.

FIG. 5 shows a part of a third charging cycle.

Referring to FIG. 5, the measured temperature of the eleventh battery cell, disposed at the middle part, was generally higher than the measured temperature of the twenty-fourth battery cell, disposed at the edge.

The maximum temperature deviation between the eleventh battery cell, disposed at the middle part, and the twenty-fourth battery cell, disposed at the edge, is 7.1° C., and the average temperature deviation therebetween is about 4° C.

It can be seen from the above description that, when the heat transfer material is applied to only the middle part of the cooling member as in the present invention, temperature deviation between the battery cells disposed at the middle part of the battery cell stack and the battery cells disposed at the edge of the battery cell stack is remarkably reduced.

Consequently, the lifespan of the battery module may be increased due to a decrease in temperature deviation between the battery cells, and therefore it is possible to prevent degradation in performance of the battery module.

Those skilled in the art to which the present invention pertains will appreciate that various applications and modifications are possible within the category of the present invention based on the above description.

DESCRIPTION OF REFERENCE SYMBOLS

100: Battery cell stack
110: Battery cell
111: Outer surface in overall length direction
120: Bottom surface of electrode assembly receiving portion
200: Module case
200': Module case disposition portion
201: First surface
300: Heat dissipation resin
400: Cooling member
401: Guide portion
410: Refrigerant inlet
420: Refrigerant outlet
450: Heat transfer material
510: Cooling plate
c1, m1: Overall widths
c2, m2: Overall lengths

INDUSTRIAL APPLICABILITY

As is apparent from the above description, it is possible to minimize temperature deviation between battery cells of a battery cell stack received in a module case according to the present invention.

Consequently, it is possible to prevent shortening in lifespan of the battery module or degradation in performance of the battery module due to temperature deviation between the battery cells.

The invention claimed is:

1. A battery module comprising:
    a module case having a battery cell stack constituted by a plurality of stacked battery cells received therein;
    a heat dissipation resin added between the battery cell stack and a first surface of the module case;
    a cooling member coupled outside the first surface of the module case, the cooling member being configured to cool the battery cell stack; and
    a heat transfer material added to a middle part of an outer surface of the cooling member and under the first surface of the module case,
    wherein the heat transfer material has a length in a first direction being equal to a length in the first direction of the module case,
    wherein the heat transfer material has a width in a second direction being less than a width in the second direction of the module case,
    wherein the plurality of stacked battery cells are stacked in the second direction, and
    wherein the heat transfer material underlies battery cells in a middle of the plurality of stacked battery cells in the second direction.

2. The battery module according to claim 1, wherein each of the plurality of stacked battery cells is a pouch-shaped battery cell,
    wherein the pouch-shaped battery cells of the battery cell stack are stacked such that bottom surfaces of electrode assembly receiving portions of the pouch-shaped battery cells are perpendicular to the first surface of the module case, and
    wherein outer surfaces of the pouch-shaped battery cells in the first direction are disposed parallel to the first surface of the module case.

3. The battery module according to claim 2, wherein the heat transfer material is added in the first direction of the module case so as to have a length corresponding to a length of the module case in the first direction.

4. The battery module according to claim 3, wherein the heat transfer material is added to the middle part of an outer surface of the cooling member when an area of the cooling member identical to the module case is divided into three equal parts along an overall width thereof.

5. The battery module according to claim 1, wherein the heat transfer material has a thickness of 0.5 mm to 3 mm.

6. The battery module according to claim 1, wherein the battery cell stack comprises a cooling plate disposed between the plurality of stacked battery cells.

7. The battery module according to claim 6, wherein the cooling plate is disposed between the plurality of stacked battery cells located at the middle of the battery cell stack.

8. The battery module according to claim 6, wherein the cooling plate is disposed at an inner surface of a part of the first surface of the module case that faces the heat transfer material.

9. The battery module according to claim 1, wherein the cooling member has a refrigerant inlet and a refrigerant outlet.

10. The battery module according to claim 1, wherein a temperature deviation between the plurality of battery cells is less than 3° C.

11. The battery module according to claim 1, wherein an overall width and an overall length of the cooling member are greater than an overall width and an overall length of the module case, respectively.

\* \* \* \* \*